United States Patent [19]
Thrasher

[11] Patent Number: 6,152,661
[45] Date of Patent: Nov. 28, 2000

[54] WOOD CORING BIT

[76] Inventor: Charles M. Thrasher, 1902 Jacksonville Dr., Henderson, Tex. 75654

[21] Appl. No.: 09/375,914

[22] Filed: Aug. 17, 1999

[51] Int. Cl.[7] ...................................................... B23B 41/02
[52] U.S. Cl. .......................... 408/204; 408/207; 408/213; 408/713
[58] Field of Search ................................... 408/204, 206, 408/207, 212, 213, 713

[56] References Cited

U.S. PATENT DOCUMENTS

| | | |
|---|---|---|
| Re. 28,900 | 7/1976 | Byers et al. |
| 2,883,888 | 4/1959 | Stewart ........................................ 76/102 |
| 3,648,508 | 3/1972 | Hougen ...................................... 408/204 |
| 4,090,807 | 5/1978 | Stewart ...................................... 408/213 |
| 4,134,706 | 1/1979 | Stewart ...................................... 408/213 |
| 4,239,427 | 12/1980 | Walton, II ................................. 408/213 |
| 4,434,826 | 3/1984 | Whitaker . |
| 5,205,685 | 4/1993 | Herbert ...................................... 408/204 |
| 5,218,888 | 6/1993 | Merrill ....................................... 408/204 |
| 5,505,272 | 4/1996 | Clark . |

FOREIGN PATENT DOCUMENTS 0039708  2/1988  Japan ........................................ 408/204

OTHER PUBLICATIONS

This Old House Books, Essential Powertools 19, tools to renovate and repair your home.
Grainger, 1997 Catolog, No. 388, p. 1377, Forstner–Type Wood Boring Bit Sets.

*Primary Examiner*—A. L. Wellington
*Assistant Examiner*—Monica Carter
*Attorney, Agent, or Firm*—Kenneth H. Johnson

[57] ABSTRACT

A wood coring bit having a base, a central guide shaft, a sleeve extending along the guide shaft, a pair of scribing teeth on the surface of the sleeve adjacent to the work piece, which scores a track into the work piece as the bit rotates and raker tooth on the surface of the sleeve adjacent of the work piece which is aligned to follow in the track scored by the scribing teeth and to cut and lift out the wood from the scored area. A helical slot extends through said sleeve from the raker tooth to receive the chip. A shank aligned with the guide shaft is used to connect the bit to a drill.

16 Claims, 2 Drawing Sheets

WOOD CORING BIT

BACKGROUND OF THE INVENTION

1. Field of the Invention

The present invention relates to a wood drill bit which makes a hole by removing a core or plug of wood.

2. Related Art

In wood frame construction the common method of making a hole for a 3" or 4" vent, drain, conduit or fire protection piping is to drill a series of small holes and saw between these holes to remove a center plug. This is very time consuming and leaves an irregular hole which may not fit the pipe which is to be installed through it. Caulking to fill around the pipe to prevent passage of flame and hot gases with fire-rated fillers is expensive and is required by building codes.

Drill bits commercially available for 3" and 4" pipe that are capable of depths of 3" or more remove 100% of the wood as the bore progresses. This is a maximum effort for the drill motor and the workman. If an obstruction such as a nail is encountered within the diameter of the hole the bit may seize up. The resulting torque may cause injury to the operator and/or the equipment.

Another device which has been used for making larger bore holes is the holesaw, which is a cup-shaped saw fitted onto a mandrel with a twist drill center. These saws are useful for drilling holes in thinner materials such as doors up to about two inches thick. The saws tend to bind with thicker materials and are not available for cuts above about two inches.

SUMMARY OF THE INVENTION

The present invention comprises a wood core bit having a base, which is preferably circular, a guide shaft that extends centrally from said base, a shank that extends from said base, distal to and axially aligned with said guide shaft, a sleeve extending about the circumference of said base. The said sleeve extending from said base, axially around a portion of said guide shaft, preferably for less than the length of the guide shaft. A pair of scribing teeth are mounted to and extend from the terminal end of said sleeve and extend axially to said guide shaft, preferably one each on the inner surface and outer surface of the sleeve, whereby said scribing teeth cut into a wooden surface to form a scribed tract as the bit is rotated which corresponds to the distance between said scribing teeth. A raker tooth is mounted onto the terminal end of said sleeve and extends axially to said guide shaft and is aligned with and sized to correspond to the distance between said scribing teeth, whereby said raker tooth removes a strip of wood from said wooden surface corresponding to said scribed tract. A helical slot extends on and through said sleeve from said raker tooth.

DETAILED DESCRIPTION

The present invention is a drill bit that will make an exact fitting hole for standard sized openings, e.g., 3" and 4" pipe to depths of a standard 4½" with options of up to 10" maximum. Deep drilling to 10" may be done with a long barrel embodiment which is very useful in two and three story wood framing construction. The present bit requires lower operating torque by the drill motor and is very easy for workmen to use. Additionally, if a nail is within the diameter of the hole, the present bit will allow the hole to be drilled without cutting the nail.

The present bit comprises a perimeter cutting steel barrel with a large spiral slot to shed the waste wood chips. It has changeable scribing and raker teeth and a center guide shaft. The scribing teeth and raker tooth may be changed easily with an Allen wrench. The donut-shaped core of wood produced inside this barrel is easily removed by using a screwdriver through the large spiral slot. The shank may have 3 milled flats for use in a ½" drill chuck.

Figure 1:
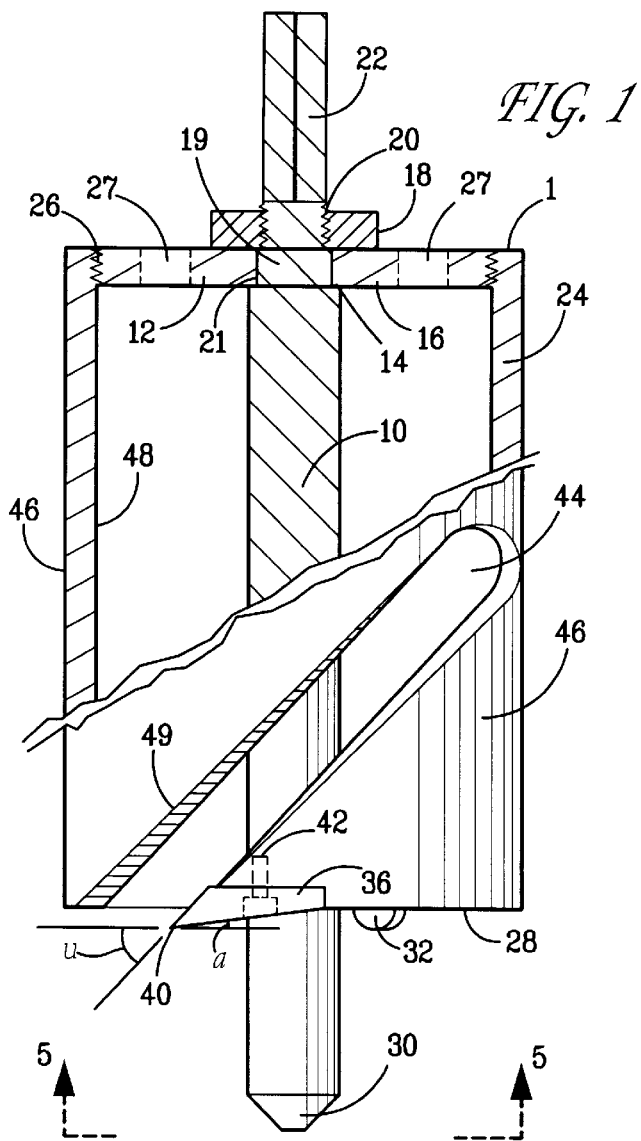
FIG. 1 is an elevational view with partial cross section of a preferred embodiment of the bit.

Referring now to FIG. 1 a bit 1 is shown with guide shaft 10 mounted into circular base 12 with a square section 19 seated in a cooperating square opening 21 in the base and extends rectilinearly therefrom. A shoulder 14 abuts against the inner surface 16 of the base and a nut 18 is tightened on the threads 20 to fasten the guide shaft to the base by gripping the base between the nut and the shoulder 14. A shank 22 extends from the guide shaft and is axially aligned with the guide shaft. The shank is preferably milled on three sides for gripping by a drill chuck (not shown).

A sleeve 24 is attached around the circumference of base 12. FIG. 1 shows threads 26 but this attachment may be welded. The base and the sleeve may also be cast as a single component. The base may have any circumference, however sizes of 2–8 inches are preferred. Similarly, the sleeve may have any length with 4 to 10 inches being preferred. Two openings 27 are extend through the base and aid in the removal of a core from the sleeve.

The guide shaft 10 extends beyond the terminal end 28 of the sleeve and will preferably have a conical or frustoconical shaped end 30.

Figure 3:
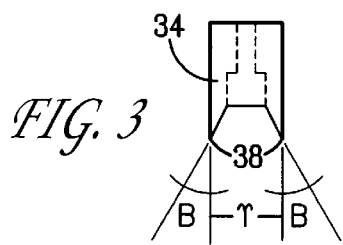
FIG. 3 is a detail of the embodiment of the scribing teeth member of FIG. 2.
Figure 6:
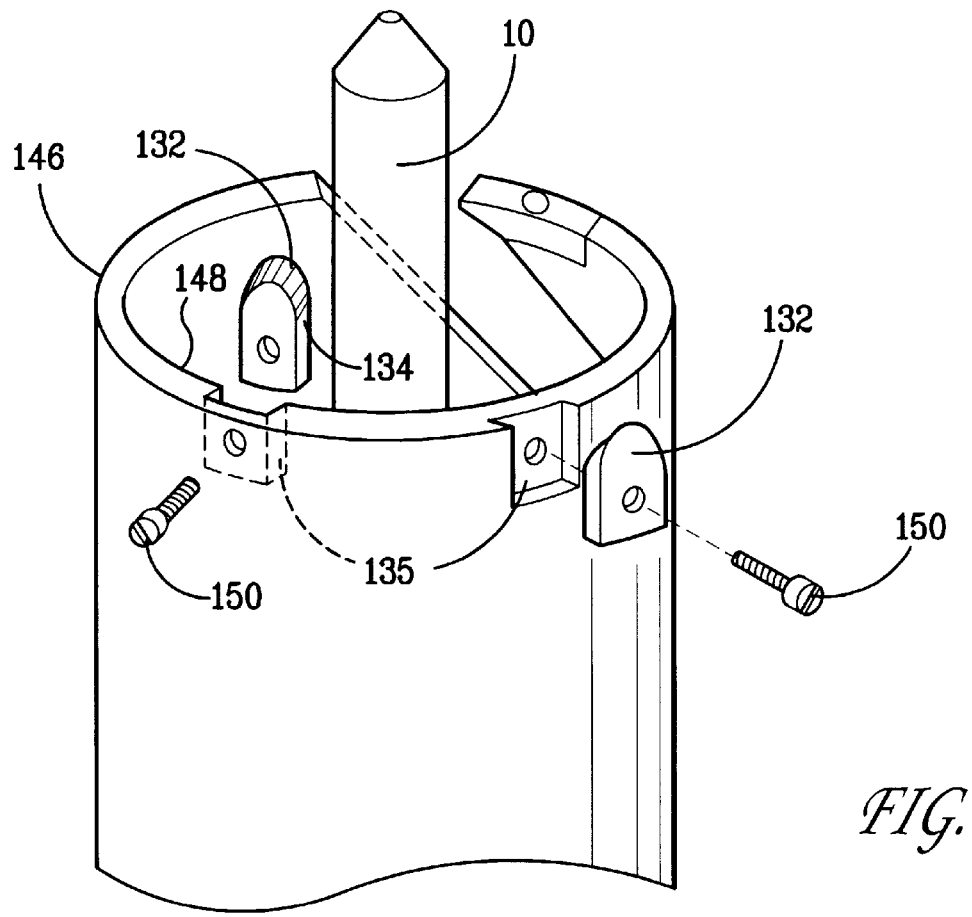
FIG. 6 is a partial isometric view of a bit having offset scribing teeth.

A pair of scribing teeth 32 are removably mounted on the terminal end 28 toward either side of the sleeve, that is, one scribing tooth is toward the inside wall 48 of the sleeve and one scribing tooth is toward the outside wall 46. Preferably the teeth are opposed and on either side of scribing teeth member 34 and extend away from the terminal end with cutting edge 38 being distal to the terminal end. The scribing teeth are axial to the guide shaft. As illustrated in FIG. 6 the scribing teeth may be spaced apart from each other on opposite sides of the sleeve. The configuration of FIG. 3 is preferred. The scribing teeth are bevelled at an angle β of their facing surfaces, preferably about 25–35, preferably about 26°.

The scribing teeth only occupy a small amount of the circumference of the terminal end of the sleeve preferably about 1 to 3% of the circumference of the terminal end, more preferably a length equal to the radius to 0.01% of the radius. Preferably the scribing teeth do not extend more than ³⁄₁₆" beyond the terminal end. For example, a 4" drill would preferably have scribing teeth of about ¼" lateral length. Larger scribing teeth, i.e., comprising up to 90% (all surface not occupied by other components) of the terminal end of the sleeve could be used, however, scribing teeth become dull with use and must be replaced or sharpened and the small teeth are less costly and easier to sharpen.

A raker tooth 36 is removably mounted on the terminal end 28 with its cutting edge extending beyond the terminal end and sized to correspond to the distance τ between the cutting edges 38 of the scribing teeth.

The raker tooth is attached to the terminal end by a screw 42 and angled away from the cutting edge 40 at an angle α of preferably >2–<7°. The angle μ of the cutting edge 40 may be from 35–45°, e.g., about 40°. Adjacent to and extending from the raker tooth is a helical slot 44 in the sleeve. The slot may extend at approximately the same angle as the cutting edge of the raker tooth. A portion of the slot 49 is angled from the inner surface 48 of the sleeve toward the outer surface 46 preferably at an angle in the range of 40–50°, e.g., about 45° making it easier for chips cut by the raker tooth to fall out. Preferably the raker teeth do not extend more than 36/1000 inch beyond the terminal end.

Figure 2:
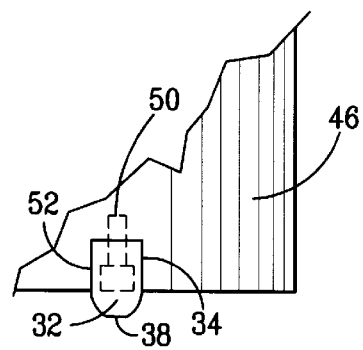
FIG. 2 is a detail of a scribing teeth member mounted on the bit.
Figure 4:
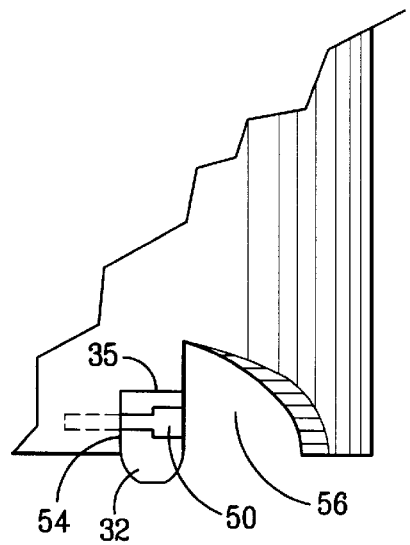
FIG. 4 is a detail of an alterative mounting for a scribing teeth member.
Figure 5:
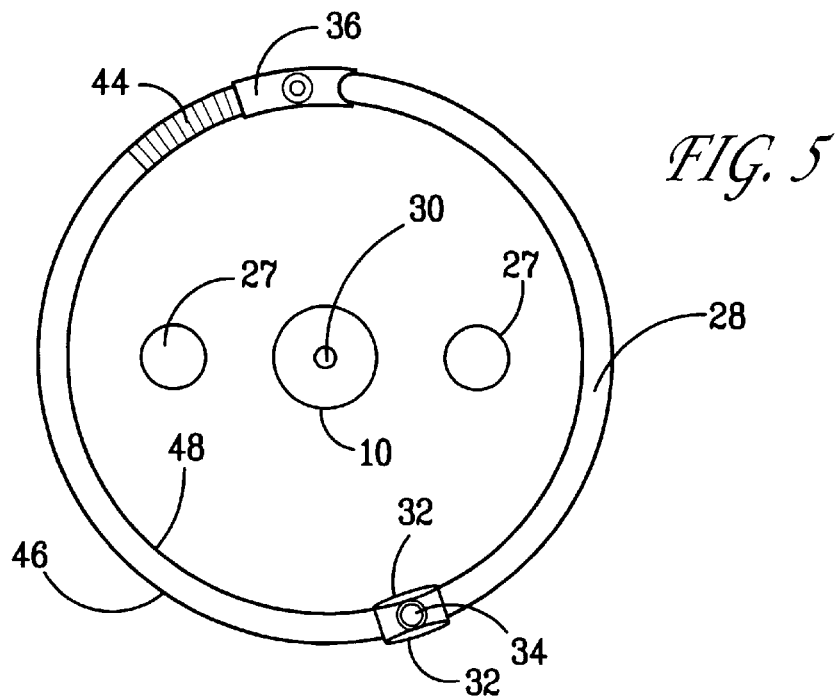
FIG. 5 is a view along 5—5 of FIG. 1.

FIG. 2 shows a preferred attachment of the scribing teeth member 34 onto the terminal end by screw 50 in notch 52. An alternative attachment is shown in FIG. 4 where scribing teeth member 35 is attached in notch 54 in a slot 56 in the sleeve by screw 50. Scribing teeth member 35 is the same as member 34 except for its manner of attachment to the sleeve.

FIG. 6 is an embodiment in which the scribing teeth 132 comprise separate individual scribing teeth members 134, each seated into a pocket 135 on either the inner surface 148 of the sleeve or outer surface 146 and attached with screws 150. The other components of the bit are the same as in FIG. 1.

To use the present bit a hole is drilled of appropriate length at the desired center location. The guide shaft of the bit is inserted into the pilot hole and the drill bit rotated clockwise in the embodiments shown usually by an electric drill motor.

In operation the scribing teeth 32 precede the raker tooth 36 as the bit is rotated and cut a track into the wood workpiece (not shown). The raker tooth follows the cut track removing chips corresponding to the width and depth of the cut track. The chip (or series of chips) fall from the slot 44 and away from the bit.

The donut-shaped core produced inside the bit may be removed by pressing the core downward with a tool passed through the slot 44 and/or openings 27. The core is preferably removed before the drilled depth is equal to the length of the slot. For example, if using a 4¼" sleeve the core should be removed when two 1½" boards have been penetrated.

Plumbers, electricians, fire sprinkler and other mechanical contractors can benefit from this tool's boring speed, on the job tooth replacement, ease of operation and accuracy of the hole bored.

The invention claimed is:

1. A wood core bit comprising:

a base, a guide shaft extending centrally from said base, a shank extending from said base, distal to and axially aligned with said guide shaft, a sleeve extending about the circumference of said base, said sleeve extending from said base and axially about a portion of said guide shaft, said sleeve having an inner surface and outer surface, a pair of scribing teeth mounted to and extending from a terminal end of said sleeve and extending axially to said guide shaft, a raker tooth mounted on said terminal end of said sleeve and extending axially from said guide shaft, said raker tooth being aligned with and sized to correspond to the distance between said scribing teeth, and a helical slot extending on and through said sleeve adjacent to and extending from said raker tooth.

2. The wood core bit according to claim 1 wherein said base is circular.

3. The wood core bit according to claim 1 wherein said guide shaft is rectilinear to said base.

4. The wood core bit according to claim 1 wherein said shank is attached to said guide shaft.

5. The wood core bit according to claim 1 wherein said sleeve extends less than the entire length of said guide shaft.

6. The wood core bit according to claim 1 wherein said scribing teeth are directly opposed.

7. The wood core bit according to claim 1 wherein said scribing teeth are spaced apart.

8. The wood core bit according to claim 1 wherein said scribing teeth are bevelled at an angle of about 25–35° on facing surfaces.

9. The wood core bit according to claim 1 wherein a portion of said helical slot is angled from the inner surface toward the outer surface of said sleeve.

10. The wood core bit according to claim 9 wherein said angle is from 40–50°.

11. The wood core bit according to claim 10 wherein said angle is about 45°.

12. The wood core bit according to claim 1 wherein scribing teeth are mounted on a member which is removably attached to said terminal end.

13. The wood core bit according to claim 1 wherein the guide shaft comprises a conical end configuration.

14. The wood core bit according to claim 1 wherein said scribing teeth extend over from 1 to 3% of the terminal end.

15. The wood core bit according to claim 1 wherein said raker tooth extends beyond the terminal end.

16. A wood core bit comprising:

a circular base, a guide shaft extending centrally and rectilinearly from said base, a shank extending from said base, distal to and axially aligned with said guide shaft, a sleeve extending about the circumference of said base, said sleeve extending from said base and axially about a portion comprising less than all of said guide shaft, said sleeve having an inner surface and outer surface, a pair of scribing teeth mounted to and extending from a terminal end of said sleeve and extending axially from said guide shaft, said scribing teeth being directly opposed to each other whereby said scribing teeth cut into a wooden surface to form a scribed tract corresponding to a distance between said scribing teeth as said bit is rotated, a raker tooth mounted on said terminal end of said sleeve and extending axially from said guide shaft, said raker tooth being aligned with and sized to correspond to the distance between said scribing teeth, whereby said raker tooth removes a strip of wood from said wooden surface corresponding to said scribed tract, and a helical slot extending on and through said sleeve adjacent to and extending from said raker tooth, a portion of said helical slot being angled from the inner surface toward the outer surface of said sleeve.

* * * * *